United States Patent
Wilczek et al.

(10) Patent No.: US 10,049,535 B1
(45) Date of Patent: Aug. 14, 2018

(54) UV GAP-SPOTTER

(71) Applicant: WOLFCUB VISION, INC., Cambridge, MA (US)

(72) Inventors: Frank Wilczek, Cambridge, MA (US); Alexander Reed Munoz, Champaign, IL (US)

(73) Assignee: WOLFCUB VISION, INC., Cambridge, MA (US)

( * ) Notice: Subject to any disclaimer, the term of this patent is extended or adjusted under 35 U.S.C. 154(b) by 0 days.

(21) Appl. No.: 15/487,725

(22) Filed: Apr. 14, 2017

Related U.S. Application Data

(60) Provisional application No. 62/322,486, filed on Apr. 14, 2016.

(51) Int. Cl.
| | | |
|---|---|---|
| G08B 21/00 | (2006.01) |
| G08B 5/36 | (2006.01) |
| G01J 1/42 | (2006.01) |
| G08B 3/10 | (2006.01) |
| G08B 5/38 | (2006.01) |

(52) U.S. Cl.
CPC ................ *G08B 5/36* (2013.01); *G01J 1/429* (2013.01); *G08B 3/10* (2013.01); *G08B 5/38* (2013.01)

(58) Field of Classification Search
CPC .... G08B 5/36; G08B 3/10; G08B 5/38; G01J 1/429; A61F 9/08
USPC .......................................................... 340/600
See application file for complete search history.

(56) References Cited

U.S. PATENT DOCUMENTS

| | | | | |
|---|---|---|---|---|
| 4,712,003 A | * | 12/1987 | Ban ........................... A61F 9/08 |
| | | | | 250/215 |
| 5,487,669 A | * | 1/1996 | Kelk ...................... A61H 3/061 |
| | | | | 434/112 |
| 6,298,010 B1 | * | 10/2001 | Ritz ........................ A61H 3/061 |
| | | | | 367/116 |
| 2005/0134497 A1 | * | 6/2005 | Mafune ................... G01S 7/285 |
| | | | | 342/27 |
| 2012/0242801 A1 | * | 9/2012 | Barnes ............... A61N 1/36046 |
| | | | | 348/46 |

* cited by examiner

*Primary Examiner* — Mark Rushing
(74) *Attorney, Agent, or Firm* — Lando & Anastasi, LLP

(57) ABSTRACT

An apparatus configured to provide enriched human-perceptible signals indicative of a parameter of electromagnetic radiation emitted by the apparatus and reflected from an object.

17 Claims, 9 Drawing Sheets

UV GAP-SPOTTER

CROSS-REFERENCE TO RELATED APPLICATIONS

This application claims priority under 35 U.S.C. § 119(e) to U.S. Provisional Patent Application No. 62/322,486, filed Apr. 14, 2016 and titled "UV GAP-Spotter," which is incorporated herein by reference in its entirety for all purposes.

BACKGROUND

Vision is the portal of human perception that allows the most rapid transfer of information, and our brains support many sophisticated ways of processing visual input. Yet basic physical and biological constraints have required important compromises. Aspects and embodiments disclosed herein work around those compromises, and provide for access to information regarding electromagnetic radiation in frequency ranges that the unaided human eye is incapable of perceiving.

Normal human color vision is trichromatic. In more detail, it is based upon taking three weighted samples of intensities across the visible spectrum of electromagnetic radiation. On the other hand, physics teaches us that the electromagnetic spectrum is continuous, and so that there is a continuum of possible intensities. Moreover, the physical spectrum extends beyond the visible, for example, to infrared and ultraviolet to which unaided human eyes are essentially insensitive. Thus there is a great deal of extra information in the signals arriving at our retina, to which we are insensitive. It could be of great value, in many applications, to make that information accessible.

SUMMARY

In accordance with one aspect, there is provided an apparatus configured to provide enriched human-perceptible signals indicative of a parameter of electromagnetic radiation emitted by the apparatus and reflected from an object. The apparatus comprises a power supply, a source of electromagnetic radiation, an electromagnetic radiation detector configured to output a first signal having a characteristic that depends on an amplitude of the electromagnetic radiation detected by the detector, an output device, and a processor configured to drive the source of electromagnetic radiation with power from the power supply, to receive the first signal from the detector, and to output a second signal to drive the output device in a manner dependent upon the amplitude of electromagnetic radiation detected by the detector.

In some embodiments, the source of electromagnetic radiation is a source of ultraviolet (UV) radiation. The source of electromagnetic radiation may include a first source of UV-A radiation and a second source of UV-B radiation.

In some embodiments, the source of electromagnetic radiation includes a first source that emits electromagnetic radiation in a frequency band that is not perceivable to an unaided human observer and a second source that emits light that is visible to an unaided human observer. The first source and the second source may be configured to illuminate a same portion of the object. The processor may be configured to modulate emission of light from the second source based on one of an intensity and a frequency of electromagnetic radiation from the first source that is reflected from the portion of the object and detected by the detector. The processor may be configured to one of cause the emission of light from the second source to blink at a frequency based on one of the intensity and the frequency of electromagnetic radiation from the first source that is reflected from the portion of the object and detected by the detector or to cause the second source to emit light at a color based on the one of the intensity and the frequency of electromagnetic radiation from the first source that is reflected from the portion of the object and detected by the detector.

In some embodiments, the output device includes one or more light emitting elements that one of illuminate, blink, or emit a color of light based on one of an intensity and a frequency of electromagnetic radiation emitted by the source of electromagnetic radiation that is reflected from a portion of the object and detected by the detector.

In some embodiments, the source of electromagnetic radiation is an adjustable source of electromagnetic radiation including components that emit electromagnetic radiation in different regions of the electromagnetic spectrum, including one or more of infrared (IR), visible, and UV frequencies, the source of electromagnetic radiation being configured to enable a signal produced by the source of electromagnetic radiation to be reflected from the object and to be received by the detector.

In some embodiments, the detector is configured to output a first signal having a characteristic that depends on one of an amplitude of electromagnetic radiation detected by the detector, a frequency of electromagnetic radiation detected by the detector, and a ratio of intensity of electromagnetic radiation in a first band detected by the detector to intensity of electromagnetic radiation in a second band detected by the detector.

In some embodiments, the output device includes an acoustic transducer that produces sound having one of a tone, a volume, or a sound pattern that is based on one of an intensity and a frequency of electromagnetic radiation emitted by the source of electromagnetic radiation that is reflected from a portion of the object and detected by the detector.

In some embodiments, the apparatus further comprises a barrier opaque to electromagnetic radiation emitted by the source of electromagnetic radiation, the barrier being disposed between the source of electromagnetic radiation and the detector.

In some embodiments, the apparatus further comprises an actuator that controls one of a band of electromagnetic radiation emitted by the source of electromagnetic radiation and a band of electromagnetic radiation that the detector is responsive to.

In some embodiments, the apparatus further comprises an actuator that initiates a self-calibration of the apparatus.

In some embodiments, the apparatus has a form factor of a flashlight, and the source of electromagnetic radiation and the detector are disposed in a head of the apparatus.

In accordance with another aspect, there is provided an apparatus configured to provide enriched human-perceptible signals indicative of a parameter of electromagnetic radiation emitted by the apparatus and reflected from an object. The apparatus comprises a power supply, a source of electromagnetic radiation, an electromagnetic radiation detector configured to output a first signal having a characteristic that depends on one of a frequency band and an amplitude of the electromagnetic radiation emitted from the source of electromagnetic radiation, reflected from a portion of the object, and detected by the detector, an output device including one of a visual indicator and an acoustic transducer, and a processor configured to drive the source of electromagnetic radiation with power from the power supply, to receive the first signal from the detector, and to output a second signal to drive the output device in a manner dependent upon the one of the frequency band and the amplitude of electromagnetic radiation detected by the detector.

In some embodiments, the output device includes a first output device that produces a signal that is modulated based on an amplitude of electromagnetic radiation in a first frequency band and a second output device that produces a signal that is modulated based on an amplitude of electromagnetic radiation in a second frequency band.

In some embodiments, the source of electromagnetic radiation includes a first source that emits electromagnetic radiation in a first band that is undetectable by an unaided human observer and second source that emits visible light. The source of electromagnetic radiation may include a third source that emits electromagnetic radiation in a second band that is undetectable by an unaided human observer. The first band may be one of an infrared band and an ultraviolet band.

BRIEF DESCRIPTION OF THE FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
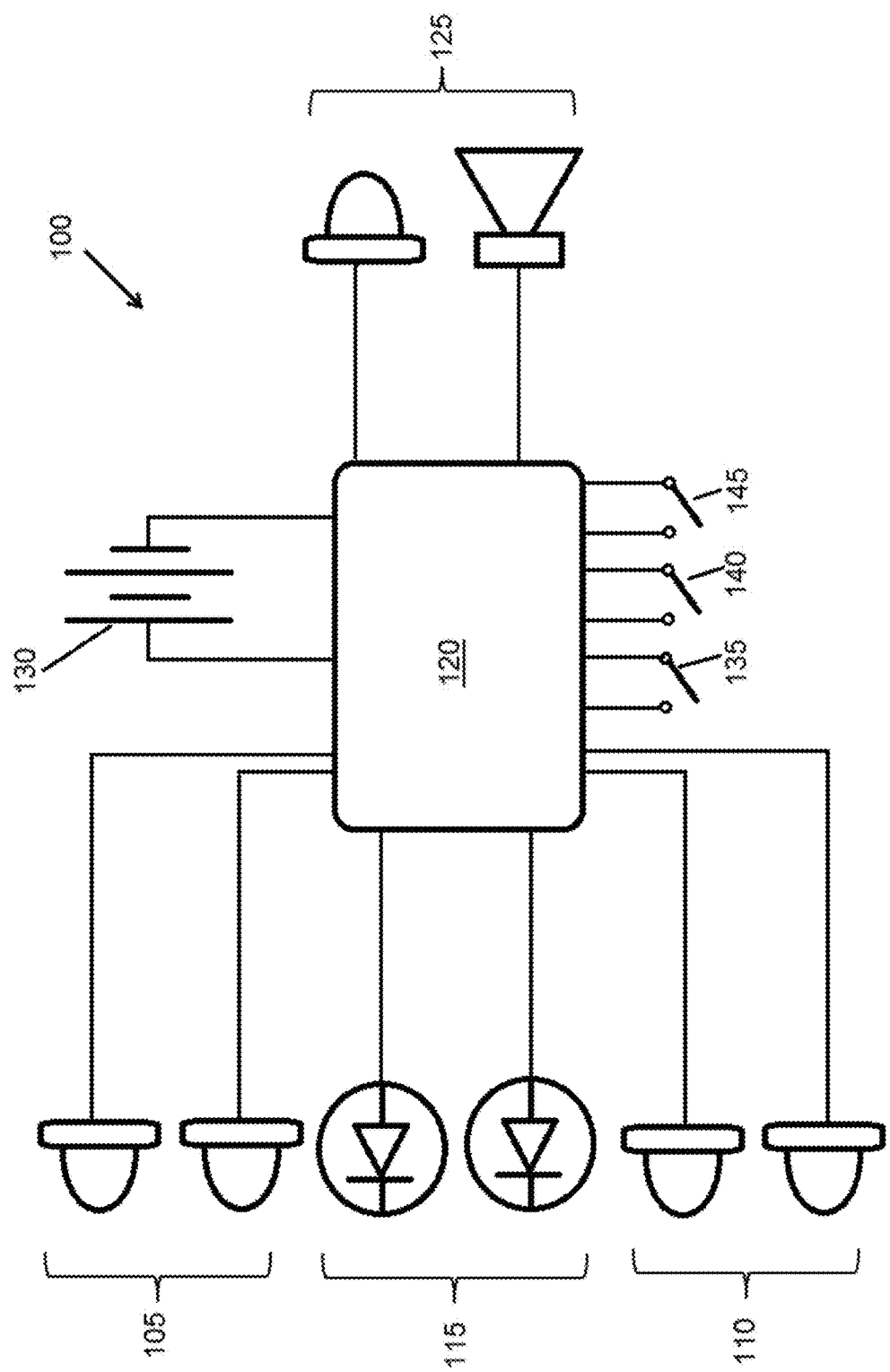
FIG. 1 is a functional diagram of components of an embodiment of a UV Gap-Spotter.

Important information about the physical and chemical characteristics of objects is encoded in the efficiency with which they reflect electromagnetic radiation at different frequencies. By comparing the reflection characteristics of different objects, or different parts of a given object, in ways that take us beyond normal color vision, we can access that kind of information, which could be of great value in many applications.

Aspects and embodiments disclosed herein include systems and methods for providing information to a user about the emission or reflection of electromagnetic radiation from an object in frequencies outside of those that are ascertainable by the unaided human eye. In some embodiments, the systems and methods disclosed herein provide information to a user about the emission or reflection of ultraviolet (UV) radiation from an object. It should be understood, however, that the systems and methods disclosed herein may also be utilized to provide information to a user about the presence, emission, or reflection of other normally visibly unperceivable frequencies of electromagnetic radiation.

In accordance with one aspect, a device enables a user to determine or measure UV reflectance from an object in one or more bands, for example, UV-A radiation (320-400 nanometer (nm) wavelength), and/or UV-B radiation (290 to 320 nm wavelength). In some embodiments, the device may allow a user to focus on small areas, for example, of about one inch (2.54 cm) in diameter, although it is also contemplated that the device may have smaller or greater analysis areas or fields of view. The device projects a beam of UV radiation onto an object and determines the presence and/or intensity of reflected UV radiation. The device provides feedback to the user regarding the presence and/or intensity of sensed reflected UV radiation, for example, audio feedback and/or visual feedback. The feedback may be modulated based on the intensity of sensed reflected UV radiation.

In one embodiment a "UV Gap-Spotter" is a compact, portable device that produces a visible or audible signal indicative of the ultraviolet reflectivity of surfaces at a point or area selected by a user. Embodiments of the UV Gap-Spotter may be utilized for one or more of multiple purposes. One particular use of embodiments of the UV Gap-Spotter is to assess the effectiveness of a sunscreen cover. Conventional sunscreens are often applied to the skin of users wishing to engage in outdoor activities while protecting themselves from the harmful effects of exposure to UV radiation from the sun, for example, to avoid sunburn and/or to avoid an increased susceptibility to skin cancer associated with exposure to UV radiation. Conventional sunscreens reflect UV radiation from the sun so that the UV radiation is not absorbed by the skin of a user who has applied the sunscreen. One problem with conventional sunscreens is that it is sometimes difficult to determine if the user has applied the sunscreen to all desired areas of the skin or has applied a desired amount of sunscreen to provide a desired amount of UV protection. This is because conventional sunscreens are typically not easily visibly detectable once applied to the skin. Further, conventional sunscreen typically washes off, for example, due to exposure to ocean or pool water or due to exposure to the sweat of a user. Sunscreen thus typically should be periodically re-applied to provide continued protection from solar UV radiation. A user, however, typically would not be able to determine to what extent applied sunscreen has washed off and when or how much fresh sunscreen should be re-applied. Use of embodiments of the UV Gap-Spotter provides for a user to ascertain if any desired areas of the skin were missed when applying sunscreen and also to determine if previously applied sunscreen has washed off and fresh sunscreen should be applied.

In some embodiments, the UV Gap-Spotter includes one or more UV emitters, for example, one or more light emitting diodes (LEDs) that emit UV-A and/or UV-B radiation as well as one or more UV detectors, for example, one or more photodiodes or phototransistors sensitive to UV-A and/or UV-B radiation. In some embodiments UV-A and/or UV-B specific filters may be utilized to filter the emission of UV light from a broadband UV light emitter and/or to filter incident UV radiation to a broadband UV light detector to provide specificity regarding emission or detection of the desired UV band. In some embodiments, the UV Gap-Spotter also includes one or more visible light emitters, for example, one or more visible light emitting LEDs that illuminate the same area as the one or more UV emitters so that the position of the selected point or area illuminated by the one or more UV emitters is made visible.

Signals from the one or more UV detectors are sent to a processor, for example, a conventional microprocessor or ASIC which converts the signals from the one or more UV detectors into a signal suitable to drive an output device, for example, a speaker or a visible light emitter to provide an output signal ascertainable by the user. The signals from the one or more UV detectors may provide information regarding not only the detection of UV radiation, but also regarding the intensity of the detected UV radiation and, in some instances, the relative intensity of detected UV-A to detected UV-B radiation. This information may be extracted or interpreted from the signals from the one or more UV detectors by the processor and the processor may modulate one or more characteristics of the user-ascertainable output signal based on this information. For example, a frequency and/or amplitude of an audible and/or visible output signal may be modulated based on the intensity of the detected UV radiation and/or the relative intensity of detected UV-A to detected UV-B radiation. In some embodiments, the presence or intensity of UV-A radiation reflection may be reported to a user separately from the presence or intensity of UV-B radiation reflection using, for example, separate signal outputs and/or by providing a switch to measure only one of UV-A or UV-B radiation at a time.

In some embodiments, the one or more visible light emitters that illuminate the same area as the one or more UV emitters of the UV Gap-Spotter may provide the user-ascertainable output signal. The visible light emitted from the one or more visible light emitters may be modulated in color or intensity, or may be "flickered" in a manner that varies with the intensity of detected reflected UV radiation. In other embodiments, one or more visible light emitters, for example, LEDs may be provided on the body of the UV Gap-Spotter and may be illuminated in a pattern indicative of the intensity of detected reflected UV radiation. For example, in one embodiment, a number of indicator LEDs may be provided and the number of indicator LEDs that illuminate may be dependent on the intensity of detected reflected UV radiation. In other embodiments, differently colored light emitting elements, for example, LEDs may be provided and the color of the light emitting element that is illuminated may be dependent on the intensity of detected reflected UV radiation. For example, a green light emitting element may be illuminated if a high intensity of reflected UV radiation is detected, a yellow light emitting element may be illuminated if an intermediate intensity of reflected UV radiation is detected, and a red light emitting element may be illuminated if only a small intensity or no reflected UV radiation is detected. In other embodiments, an indicator LED may be flickered or blink in a manner that varies with the intensity of detected reflected UV radiation, for example, the indicator LED may flicker at a frequency that increases (or alternatively decreases) with an increasing level of detected reflected UV radiation. The indicator LED may be flickered in a manner that varies with the intensity of detected reflected UV radiation in both UV-A and UV-B bands, or, additionally or alternatively, a first flickering indicator LED maybe provided to indicate the intensity of detected reflected UV-A radiation and a second flickering indicator LED maybe provided to indicate the intensity of detected reflected UV-B radiation. An indicator LED may also or alternatively be provided that may be flickered in a manner that varies (e.g., increases or decreases in flickering frequency) based on the ratio of the intensity of detected reflected UV-A radiation to the intensity of detected reflected UV-B radiation.

In some embodiments, in addition to or as an alternative to providing a user-ascertainable visible output signal, the UV Gap-Spotter may provide an audible output signal that by be modulated based on the intensity of detected UV radiation. For example, a speaker included in the UV Gap-Spotter may be driven by the processor of the UV Gap-Spotter to output a tone or other type of audio signal that may vary based on the intensity of detected UV radiation. In some embodiments, the frequency of a tone output by the speaker may vary based upon the intensity of detected UV radiation. In some embodiments, an amplitude of an audio signal output by the speaker may vary based upon the intensity of detected UV radiation. In other embodiments, the speaker may output a series of clicks, similar to a Geiger counter, with the number per unit time (e.g., the frequency) and/or amplitude of clicks varying with intensity of detected UV radiation, for example increasing (or decreasing) in response to increasing amplitudes of detected reflected UV radiation. In some embodiments, the tone, amplitude, and/or frequency of the audio output may also be dependent upon the UV band (UV-A or UV-B) being detected.

Embodiments of the UV Gap-Spotter may include functionality to calibrate the UV Gap-Spotter. In one example, the UV detector or detectors of the UV Gap-Spotter may be pointed at an object under typical illumination conditions, for example, at the skin of a user illuminated with outdoor sunlight at a typical intensity, without the UV emitters activated. The processor may receive a calibration signal or signals from the UV detector or detectors indicative of the normal intensity ambient UV radiation reflected from the object under the typical illumination conditions. The UV Gap-Spotter may record the magnitude of the calibration signal or signals or the UV intensity represented by same in a memory associated with the processor and use the recorded magnitude(s) and/or intensity or intensities as baseline values. The baseline values would be subtracted from actual measurement values taken during use of the UV Gap-Spotter. In another example, the UV detector or detectors of the UV Gap-Spotter may be pointed at an object under typical illumination conditions, for example, at the skin of a user illuminated with outdoor sunlight at a typical intensity without the UV emitters activated and the ratio of the detected intensity of UV-A to UV-B radiation determined by the processor. The ratio of the detected intensity of UV-A to UV-B radiation may be compared to an expected ratio of UV-A to UV-B radiation in the location and/or altitude of use of the UV Gap-Spotter and a signal gain associated with one of the UV-A or UV-B radiation detection signals changed in the processor so that the processor provides an output signal or signals consistent with the expected ratio of UV-A to UV-B radiation intensity. In some embodiments, the UV Gap-Spotter may include a button or other actuator to initiate a calibration routine as in either of these examples.

In some embodiments, the UV Gap-Spotter may include one or more safety features. For example, the UV Gap-Spotter may require a code to be entered to turn on the UV Gap-Spotter. This code may be a personal identification number (PIN) input into an interface pad of the UV Gap-Spotter or may be a pattern of a sequence and/or duration of activation of one or more controls of the UV Gap-Spotter. For example, one may be required to toggle one control and/or hold down a control for a pre-determined time period before the UV Gap-Spotter will turn on. In other embodiments, the UV Gap-Spotter will turn off after a pre-determined time period. This prevents the UV Gap-Spotter from inadvertently being left on and exposing a user to undesirable UV radiation for an extended time period.

A block diagram of components of an embodiment of the UV Gap-Spotter 100 is illustrated in FIG. 1. The UV Gap-Spotter 100 includes one or more emitters 105 of UV radiation. Emitters 105 may be LEDs. Emitters 105 may emit the same band or frequency of UV radiation or a subset of emitters may emit UV radiation in a first band or frequency (e.g., UV-A radiation) and a second subset of emitters 105 may emit UV radiation in a second band or frequency (e.g., UV-B radiation). The UV Gap-Spotter 100 includes a visible light emitter 110, for example, one or more visible light LEDs. Emitter 110 may illuminate a substantially same area of an object being examined by the UV Gap-Spotter 100 as emitters 105 and thus may provide an indication to a user what area of an object is being examined by the UV Gap-Spotter 100. Emitter 110 may also be utilized to provide an output signal to a user of the UV Gap-Spotter 100. For example, as discussed above, visible light emitted by emitter 110 may be modulated in color, or intensity, or may be "flickered" in a manner that varies with the intensity of reflected UV radiation detected by the UV Gap-Spotter 100.

The UV Gap-Spotter 100 includes one or more sensors 115 capable of detecting UV radiation and capable of providing a signal indicative of the intensity of the detected UV radiation. Sensors 115 may be, for example, photodiodes or phototransistors. In some embodiments, each of sensors 115 is sensitive to a same band of UV radiation. Different of sensors 115 may include or be fitted with filters to limit their sensitivity to specific bands of UV radiation, for example, UV-A or UV-B radiation. In other embodiments different of sensors 115 or different subsets of sensors 115 are sensitive to different bands of UV radiation, for example, UV-A or UV-B radiation without the use of filters.

UV Gap-Spotter 100 includes at least one processor 120. Processor 120 is configured to interpret signals provided by sensors 115 and produce an output signal based upon the signals received from the sensors 115. Processor 120 provides the output signal to one or more output devices 125, for example, a visible light emitter or emitters (which may be or include visible light emitter(s) 110) or a sound emitter (e.g., a speaker) and drives the one or more output devices 125 to produce a user-ascertainable output signal. UV Gap-Spotter 100 further includes a power source 130, for example, a battery, and one or more controls 135, 140, 145 which may include, for example, an on/off switch 135, a frequency selector 140, and a calibration routine initiator 145.

Figure 2:
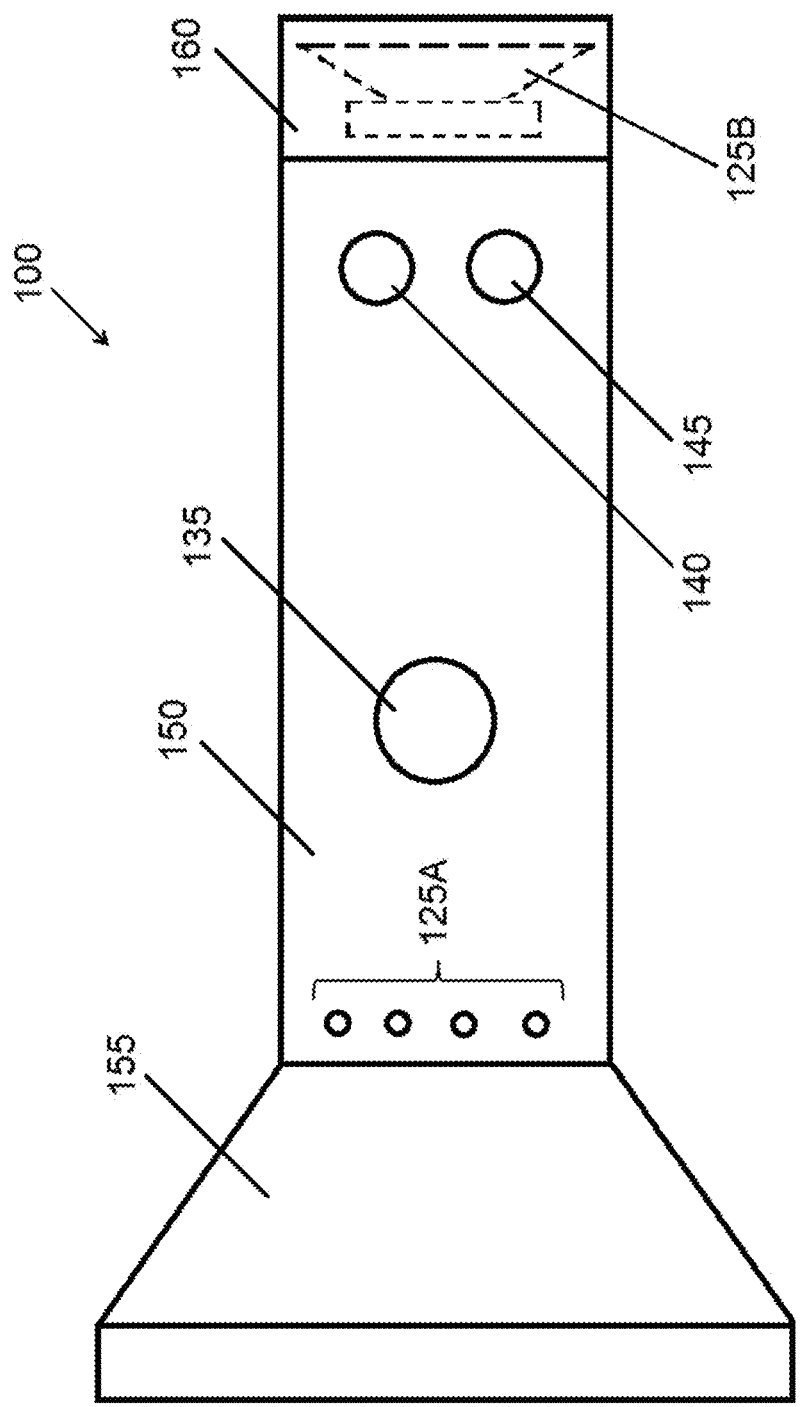
FIG. 2 is a plan view of an embodiment of a UV Gap-Spotter.

In one embodiment, the UV Gap-Spotter 100 may have a form factor similar to that of a conventional flashlight. Such an embodiment is illustrated in FIG. 2. The flashlight-like embodiment of the UV Gap-Spotter 100 includes a barrel 150, a head 155 coupled to a forward end of the barrel 150, and a tail cap 160 coupled to a rear end of the barrel 150. The controls of the UV Gap-Spotter 100, for example, on/off switch 135, frequency selector 140, and calibration routine initiator 145 may be implemented as buttons disposed on the barrel 150. In other embodiments, one or more of these controls may be disposed on alternate portions of the UV Gap-Spotter 100 or implemented in different forms, for example, one of the controls 135, 140, 145 may be actuated by turning the head 155 relative to the barrel 150. The processor 120 and power supply 130 may be disposed internal to the barrel. In some embodiments, the power supply may include one or more AA or D sized batteries, similar to a conventional flashlight. The flashlight-like embodiment of the UV Gap-Spotter 100 may be compact and portable, having on overall length of, for example about 200 mm and a maximum head diameter of about 50 mm, although these dimensions are only examples and may vary in different embodiments.

The one or more output devices 125 may include, for example, one or more visible light emitters, for example, LEDs 125A disposed on the barrel 150 or other portion of the UV Gap-Spotter 100. The number, brightness, pulse or flickering frequency, and/or color of LEDs 125A that are illuminated may be varied dependent on the amount and/or type (e.g., UV-A vs. UV-B) of reflected UV radiation detected by the UV Gap-Spotter 100. Additionally or alternatively, an output device 125 in the form of a speaker 125B or other sound generating device may be disposed on or in the barrel 150 or in the tail cap 160 as illustrated in FIG. 2. The frequency, amplitude, and/or pattern of sounds produced by the speaker 125B may be varied dependent on the amount and/or type (e.g., UV-A vs. UV-B) of reflected UV radiation detected by the UV Gap-Spotter 100.

Figure 3:
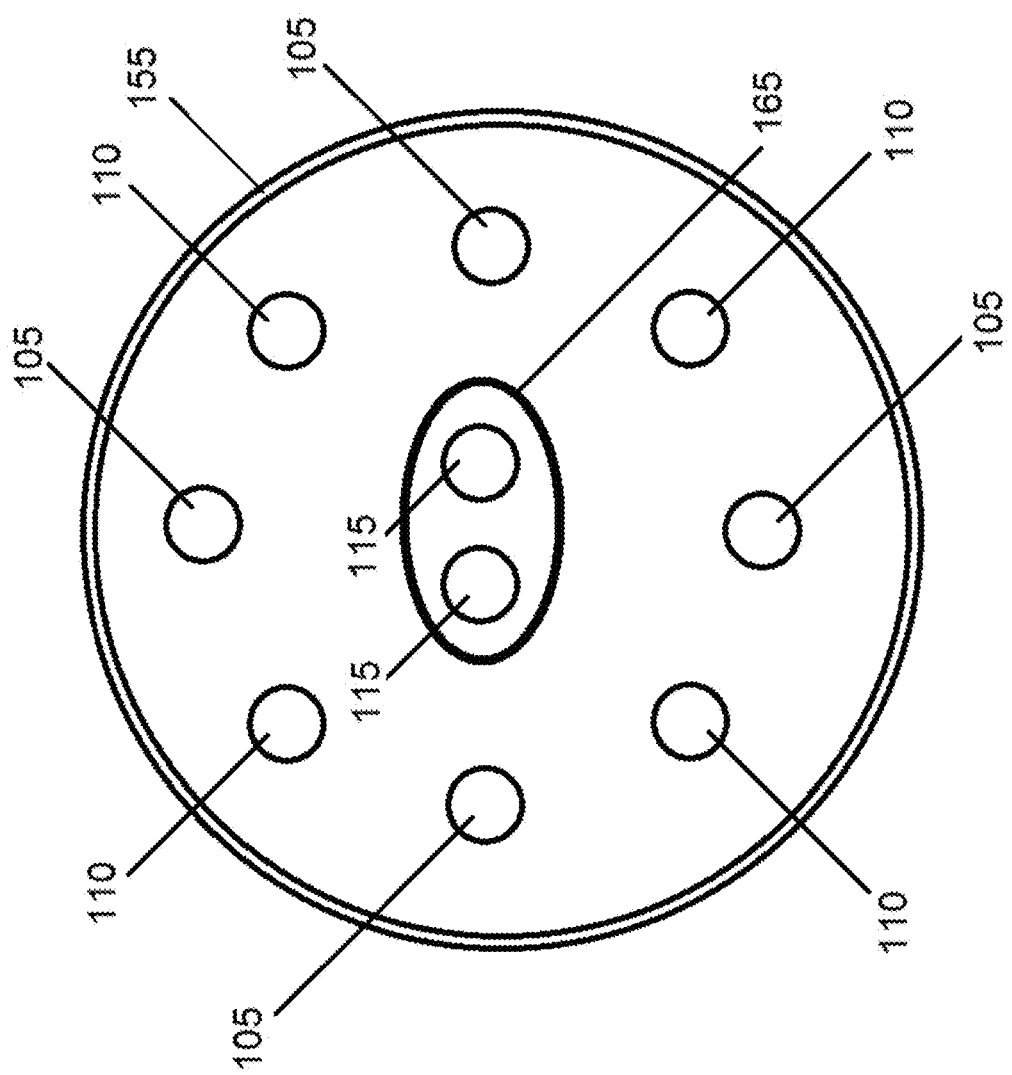
FIG. 3 is an elevational view of the head of the UV Gap-Spotter of FIG. 2.

The UV radiation emitter(s) 105, the visible light emitter(s) 110, and the sensor(s) 115 may be disposed within the head 155. As illustrated in FIG. 3, a plurality of UV radiation emitters 105, visible light emitters 110, and sensors 115 may be disposed within the head 155 and arranged to emit or sense light in front of the head 155. In some embodiments, the UV radiation emitters 105 may include a subset that emit or that are filtered to emit light in a first band, for example, UV-A light, while a second subset emit or are filtered to emit light in a second band, for example, UV-B light. The visible light emitters 110 may be configured to illuminate a same area of an object as the UV radiation emitters 105. In some embodiments, one or more of the visible light emitters 110 may be an output device configured to modulate a pattern of light output by the light emitter dependent on the amount and/or type of reflected UV radiation detected by the UV Gap-Spotter 100. In the embodiment of FIG. 3, there are two sensors 115. In some embodiments, the two sensors 115 may be sensitive to the same band of light. In other embodiments, the two sensors 115 may be sensitive to, or be filtered to receive different bands of light. For example, one of sensors 115 may be sensitive to or filtered to receive only UV-A light while the other of the sensors 115 is sensitive to or filtered to receive only UV-B light. In some embodiments a UV-opaque barrier 165 may be provided between the sensors 115 and the UV radiation emitters 105 so that UV light reflected from an object may reach sensors 115, but light directly from UV radiation emitters 105 is blocked from reaching sensors 115. In other embodiments, fewer or greater of UV radiation emitters 105, visible light emitters 110, and/or sensors 115 may provided and may be provided in a different arrangement than illustrated in FIG. 4.

Figure 4:
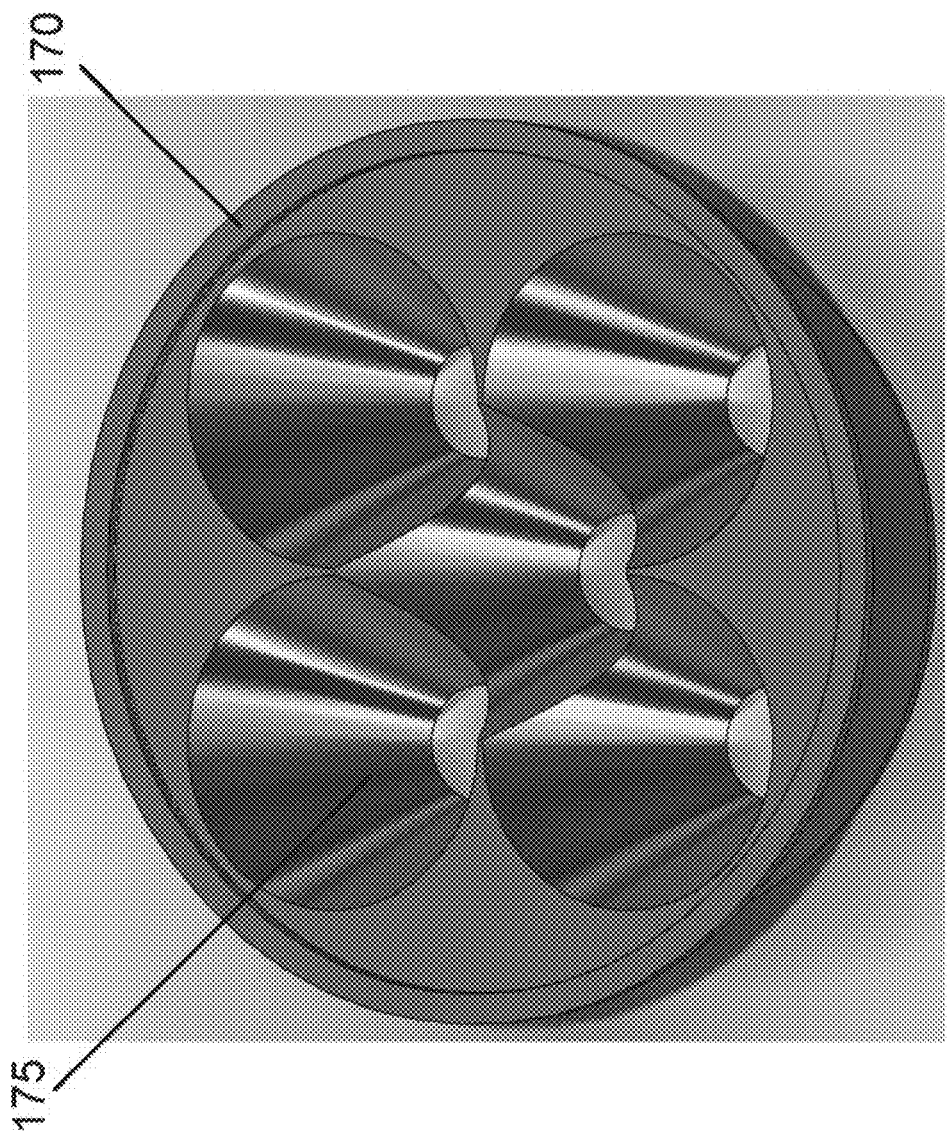
FIG. 4 illustrates an embodiment of a reflector assembly that may be utilized in the UV Gap-Spotter of FIG. 2.

In another embodiment, the head 155 may include one or more reflectors about the UV radiation emitters 105, visible light emitters 110, and/or sensors 115. An embodiment of a reflector assembly 170 is illustrated in FIG. 4. Reflector assembly 170 includes reflector cavities 175 for five of a combination of radiation emitters 105, visible light emitters 110, and/or sensors 115, but it should be appreciated that other embodiments may be provided with a greater or lesser number of reflector cavities 175 to accommodate a greater or lesser number of UV radiation emitters 105, visible light emitters 110, and/or sensors 115.

Figure 5:
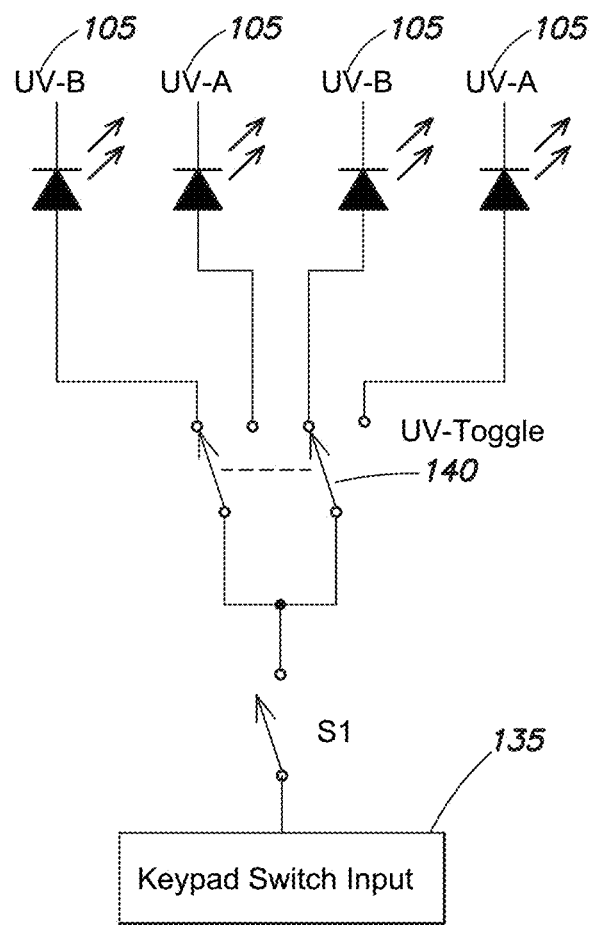
FIG. 5 is circuit diagram of a portion of a circuit that may be utilized in embodiments of a UV Gap-Spotter.

An example of a portion of a circuit utilized to control activation of the UV radiation emitters 105 in an embodiment of the UV Gap-Spotter 100 is illustrated in FIG. 5. As illustrated, a main keypad switch input, for example, an on/off switch 135 on the barrel 150 of the UV Gap-Spotter 100 may be activated to open or close main power switch 51. A second activator, for example, frequency selector 140 on the barrel 150 of the UV Gap-Spotter 100 may be activated to switch the UV-Toggle switch to select which of UV light emitters 105, the UV-A emitters or the UV-B emitters, to activate. In another embodiment, the frequency selector 140 may include a setting to activate both the UV-A emitters and the UV-B emitters simultaneously.

Figure 6:
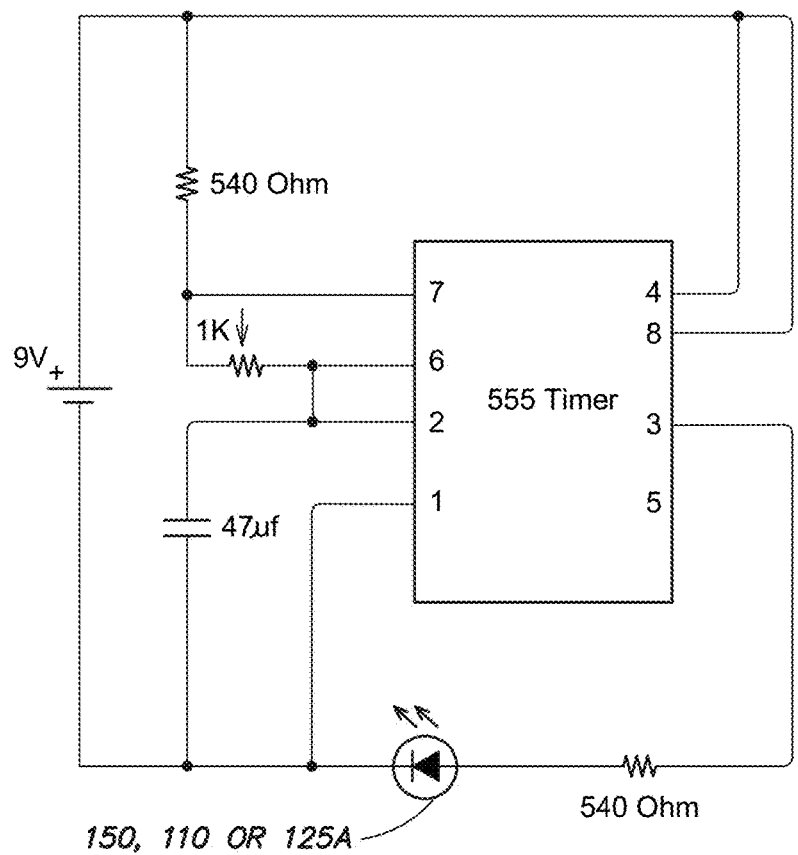
FIG. 6 is circuit diagram of a portion of another circuit that may be utilized in embodiments of a UV Gap-Spotter.
Figure 7:
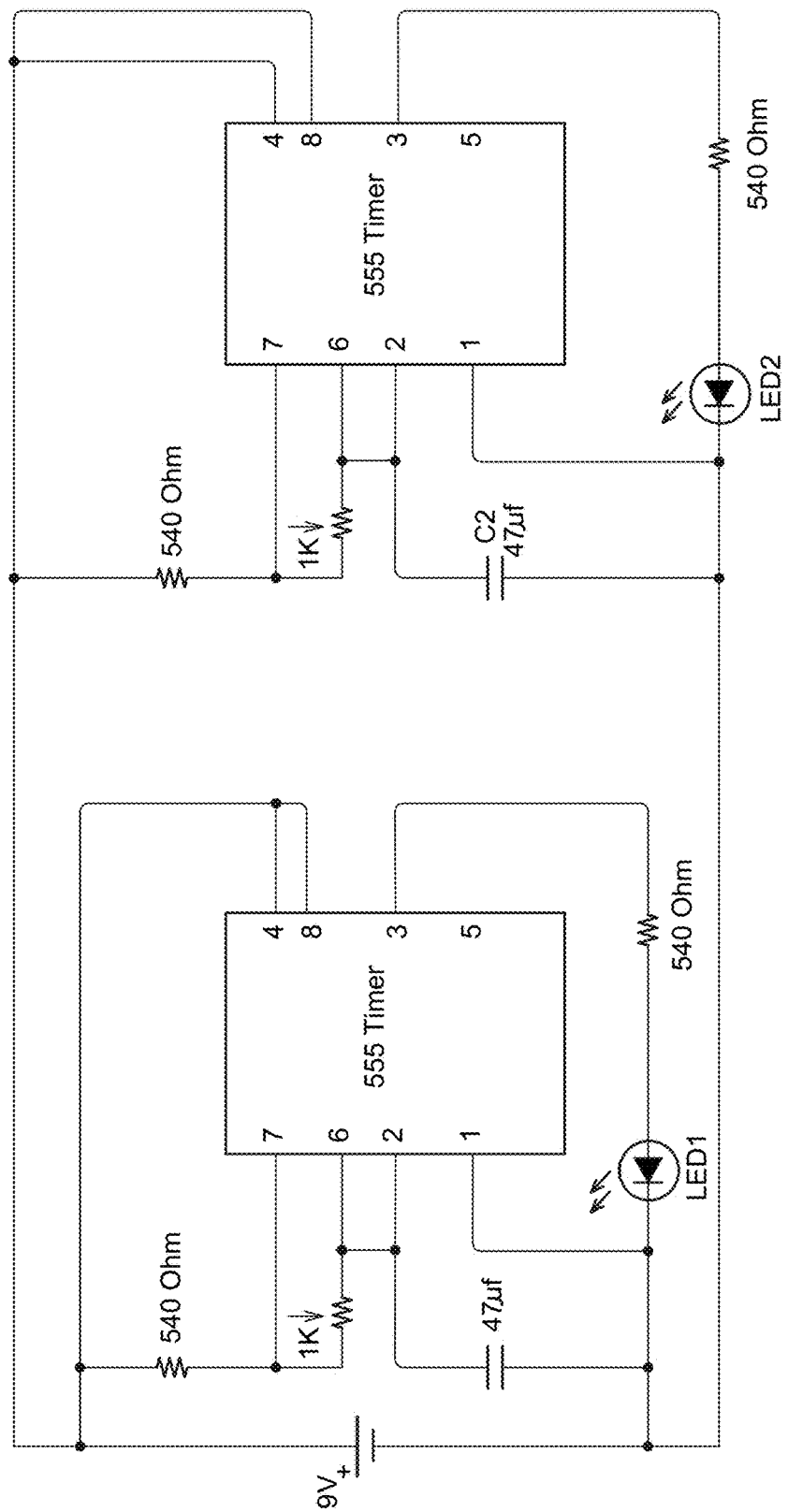
FIG. 7 is circuit diagram of a portion of another circuit that may be utilized in embodiments of a UV Gap-Spotter.

FIG. 6 illustrates an example of a driver circuit that may be used to drive any one or more of emitters 105 or 110 or output LED(s) 125A in an embodiment of the UV Gap-Spotter 100. The driver circuit illustrated includes a 555 timer integrated circuit that provides for the emitters 105 or 110 or output LED(s) 125A to be driven in a pulsed or oscillating manner. The driver circuit may be replicated to drive different of emitters 105 or 110 or output LED(s) 125A, as illustrated in FIG. 7. In some embodiments, the 555 timer may be incorporated into processor 120, and in other embodiments, may be a separate element. The 9V power supply illustrated in FIG. 6 and FIG. 7 may be power source 130, a voltage output from the processor 120, or a separate power supply.

Figure 8:
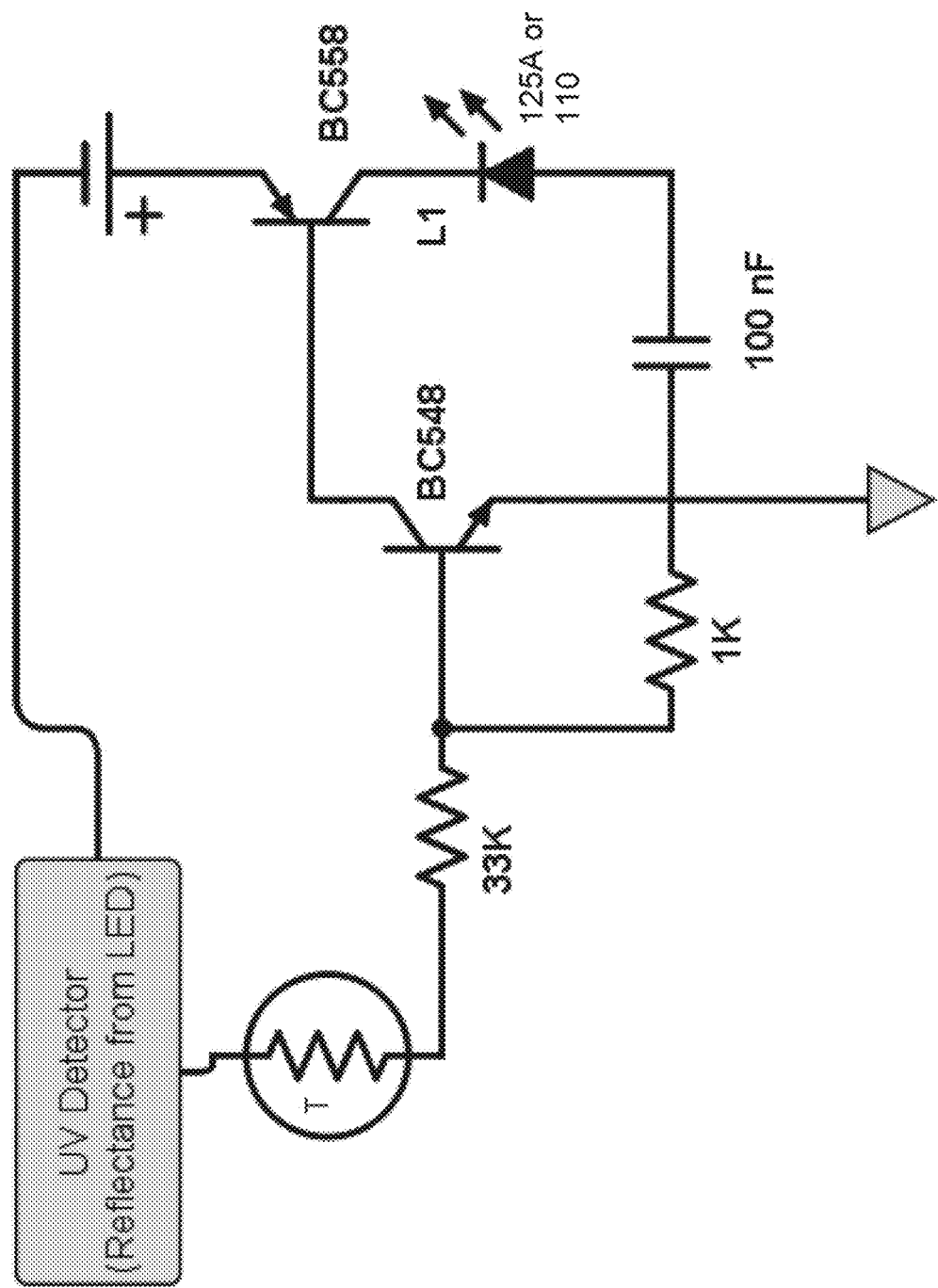
FIG. 8 is circuit diagram of a portion of another circuit that may be utilized in embodiments of a UV Gap-Spotter.
Figure 9:
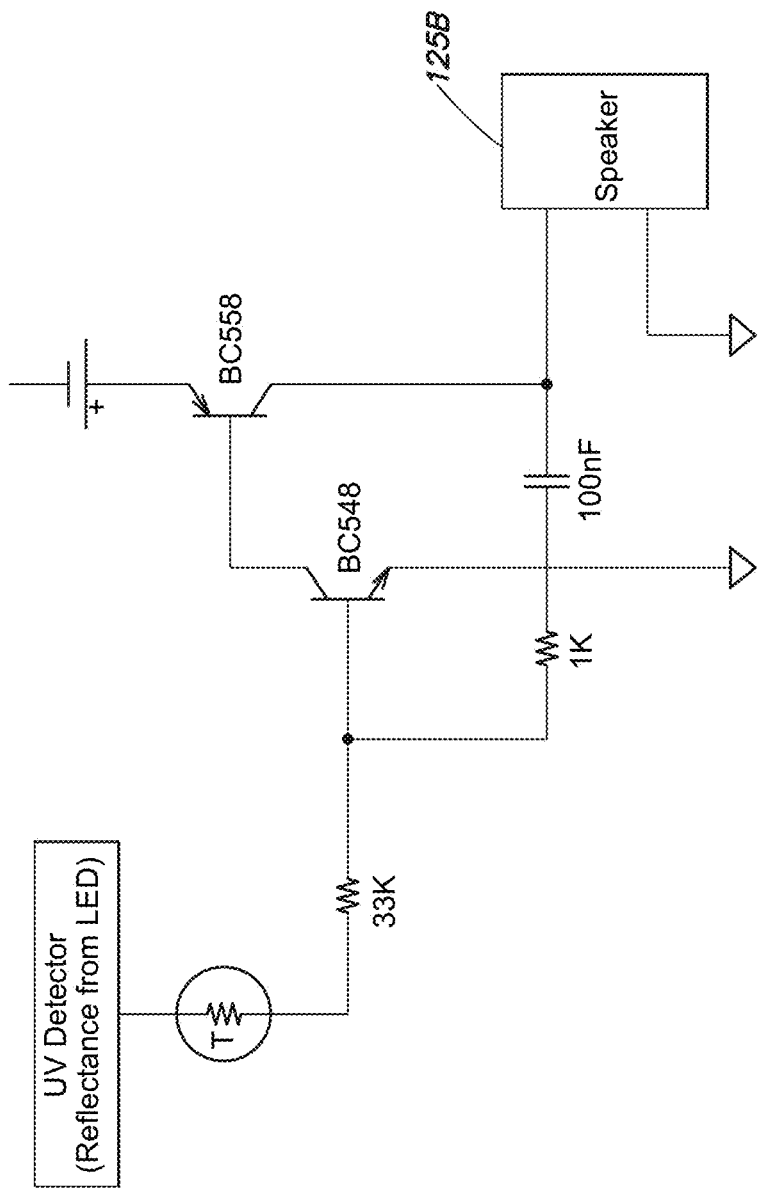
FIG. 9 is circuit diagram of a portion of another circuit that may be utilized in embodiments of a UV Gap-Spotter.

FIG. 8 illustrates a driver circuit that may be used to drive an output light emitter 125A or 110 of an embodiment of the UV Gap-Spotter 100. FIG. 9 illustrates a driver circuit that may be used to drive an output speaker 125B of an embodiment of the UV Gap-Spotter 100. The "UV Detector" element in FIG. 8 and FIG. 9 may be a portion of processor 120 or a separate element. The power source illustrated in FIG. 8 and FIG. 9 may be power source 130, a voltage output from the processor 120, or a separate power supply.

It is to be understood that the circuits illustrated in FIG. 5-FIG. 9 are examples only. Alternate circuits or circuits similar to those illustrated but with different components or components having electrical parameters different from those illustrated may be utilized in different embodiments.

Embodiments of the UV Gap-Spotter have been described above with reference to emitting and detecting reflected UV light from an object, specifically from the skin of a user. In other implementations, the UV Gap-Spotter may be utilized to inspect UV reflective coatings on other objects, for example, eyeglasses, windows, sports goggles, etc. In other embodiments, the UV Gap-Spotter may be utilized with other wavelengths of light or combinations thereof. For example, the UV Gap-Spotter may be configured to emit and measure the intensity of reflected infrared (IR) light in one or more frequency bands. The UV Gap-Spotter (potentially renamed as the "IR Gap-Spotter") could then be used to examine, for example, heat reflective coatings on various objects for defects. In further embodiments, the UV Gap-Spotter may be configured to emit and measure the intensity of reflected light in multiple bands, for example, red, green, and blue light. The ratio of the reflected intensities of the red, green, and blue light may provide for this embodiment of the UV Gap-Spotter to provide an output indicative of a color of an object in RGB coordinates. This embodiment of the UV Gap-Spotter could be utilized to help match colors of different objects, for example, to select a paint mixture that matches existing paint on a wall of a building or to perform quality control of paint or pigment manufacturers. Embodiments of the UV Gap-spotter may be configured to emit and measure reflected light in any of a number of alternative wavelengths and these embodiments are intended to fall within the scope of the present disclosure.

It is to be appreciated that aspects and embodiments disclosed above are examples and the present disclosure is not limited to these examples. All features disclosed in the embodiments disclosed herein need not necessarily be included and may be omitted, replaced by alternate features, or supplemented by additional features. Features of any embodiment may be combined or substituted or added to the features of any other embodiment.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. An apparatus configured to provide enriched human-perceptible signals indicative of a parameter of electromagnetic radiation emitted by the apparatus and reflected from an object, the apparatus comprising:
    a power supply;
    a source of electromagnetic radiation including a first source that emits electromagnetic radiation in a frequency band that is not perceivable to an unaided human observer and a second source that emits light that is visible to an unaided human observer;
    an electromagnetic radiation detector configured to output a first signal having a characteristic that depends on an amplitude of the electromagnetic radiation detected by the detector;
    an output device; and
    a processor configured to drive the source of electromagnetic radiation with power from the power supply, to receive the first signal from the detector, and to output a second signal to drive the output device in a manner dependent upon the amplitude of electromagnetic radiation detected by the detector,
    wherein the processor is further configured to modulate emission of light from the second source based on one of an intensity and a frequency of electromagnetic radiation from the first source that is reflected from the portion of the object and detected by the detector.

2. The apparatus of claim 1, wherein the source of electromagnetic radiation is a source of ultraviolet (UV) radiation.

3. The apparatus of claim 2, wherein the source of electromagnetic radiation includes a first source of UV-A radiation and a second source of UV-B radiation.

4. The apparatus of claim 1, wherein the first source and the second source are configured to illuminate a same portion of the object.

5. The apparatus of claim 1, wherein the processor is configured to one of cause the emission of light from the second source to blink at a frequency based on one of the intensity and the frequency of electromagnetic radiation from the first source that is reflected from the portion of the object and detected by the detector or to cause the second source to emit light at a color based on the one of the intensity and the frequency of electromagnetic radiation from the first source that is reflected from the portion of the object and detected by the detector.

6. The apparatus of claim 1, wherein the output device includes one or more light emitting elements that one of illuminate, blink, or emit a color of light based on one of an intensity and a frequency of electromagnetic radiation emitted by the source of electromagnetic radiation that is reflected from a portion of the object and detected by the detector.

7. The apparatus of claim 1, wherein the source of electromagnetic radiation is an adjustable source of electromagnetic radiation including components that emit electromagnetic radiation in different regions of the electromagnetic spectrum, including one or more of infrared (IR), visible, and UV frequencies, the source of electromagnetic radiation being configured to enable a signal produced by the source of electromagnetic radiation to be reflected from the object and to be received by the detector.

8. The apparatus of claim 1, wherein the detector is configured to output a first signal having a characteristic that depends on one of an amplitude of electromagnetic radiation detected by the detector, a frequency of electromagnetic radiation detected by the detector, and a ratio of intensity of electromagnetic radiation in a first band detected by the detector to intensity of electromagnetic radiation in a second band detected by the detector.

9. The apparatus of claim 1, wherein the output device includes an acoustic transducer that produces sound having one of a tone, a volume, or a sound pattern that is based on one of an intensity and a frequency of electromagnetic radiation emitted by the source of electromagnetic radiation that is reflected from a portion of the object and detected by the detector.

10. The apparatus of claim 1, further comprising a barrier opaque to electromagnetic radiation emitted by the source of electromagnetic radiation, the barrier being disposed between the source of electromagnetic radiation and the detector.

11. The apparatus of claim 1, further comprising an actuator that controls one of a band of electromagnetic radiation emitted by the source of electromagnetic radiation and a band of electromagnetic radiation that the detector is responsive to.

12. The apparatus of claim 1, further comprising an actuator that initiates a self-calibration of the apparatus.

13. The apparatus of claim 1, having a form factor of a flashlight, the source of electromagnetic radiation and the detector being disposed in a head of the apparatus.

14. An apparatus configured to provide enriched human-perceptible signals indicative of a parameter of electromagnetic radiation emitted by the apparatus and reflected from an object, the apparatus comprising:
   a power supply;
   a source of electromagnetic radiation including a first source that emits electromagnetic radiation in a first band that is undetectable by an unaided human observer and a second source that emits visible light;
   an electromagnetic radiation detector configured to output a first signal having a characteristic that depends on one of a frequency band and an amplitude of the electromagnetic radiation emitted from the source of electromagnetic radiation, reflected from a portion of the object, and detected by the detector;
   an output device including one of a visual indicator and an acoustic transducer; and
   a processor configured to drive the source of electromagnetic radiation with power from the power supply, to receive the first signal from the detector, and to output a second signal to drive the output device in a manner dependent upon the one of the frequency band and the amplitude of electromagnetic radiation detected by the detector,
   wherein the processor is further configured to modulate emission of light from the second source based on one of an intensity and a frequency of electromagnetic radiation from the first source that is reflected from the portion of the object and detected by the detector.

15. The apparatus of claim 14, wherein the output device includes a first output device that produces a signal that is modulated based on an amplitude of electromagnetic radiation in a first frequency band and a second output device that produces a signal that is modulated based on an amplitude of electromagnetic radiation in a second frequency band.

16. The apparatus of claim 14, wherein the source of electromagnetic radiation includes a third source that emits electromagnetic radiation in a second band that is undetectable by an unaided human observer.

17. The apparatus of claim 14, wherein the first band is one of an infrared band and an ultraviolet band.

* * * * *

UNITED STATES PATENT AND TRADEMARK OFFICE
CERTIFICATE OF CORRECTION

PATENT NO. : 10,049,535 B1  
APPLICATION NO. : 15/487725  
DATED : August 14, 2018  
INVENTOR(S) : Frank Wilczek et al.

Page 1 of 1

It is certified that error appears in the above-identified patent and that said Letters Patent is hereby corrected as shown below:

In the Specification

Column 9, Line 1, delete "51" and insert -- S1 --.

Signed and Sealed this
Eighteenth Day of September, 2018

Andrei Iancu
*Director of the United States Patent and Trademark Office*